United States Patent
Chang et al.

(10) Patent No.: US 10,640,612 B2
(45) Date of Patent: *May 5, 2020

(54) MACROMOLECULAR POLYMER AND PRODUCTION METHOD THEREOF

(71) Applicant: Southwest University of Science and Technology, Mianyang (CN)

(72) Inventors: Guanjun Chang, Mianyang (CN); Li Yang, Mianyang (CN); Zhongyuan Lu, Mianyang (CN); Junxiao Yang, Mianyang (CN)

(73) Assignee: SOUTHWEST UNIVERSITY OF SCIENCE AND TECHNOLOGY, Mianyang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,041

(22) Filed: Jan. 30, 2018

(65) Prior Publication Data

US 2018/0346650 A1  Dec. 6, 2018

(51) Int. Cl.
*C08G 73/06* (2006.01)
*C08G 65/40* (2006.01)

(52) U.S. Cl.
CPC ........ *C08G 73/0672* (2013.01); *C08G 65/40* (2013.01); *C08G 65/4056* (2013.01)

(58) Field of Classification Search
CPC ... C08G 73/0672; C08G 6/40; C08G 65/4056
See application file for complete search history.

(56) References Cited

U.S. PATENT DOCUMENTS 7,034,164 B1 * 4/2006 Cosnier ............... C07C 235/84
548/562

* cited by examiner

*Primary Examiner* — Nicole M. Buie-Hatcher
(74) *Attorney, Agent, or Firm* — WPAT, PC (57) ABSTRACT

A macro-molecular polymer and its preparation method. The macro-molecular polymer takes disulfonate-difluorobenzophenone, hydroxyindole and difluorobenzophenone as monomers for which a sulfonate group of the disulfonate-difluorobenzophenone is a metal cation. High-performance polymers can be obtained with crosslinked structure among molecular chains by a way of interaction of metal cations –π, and further to obtain a high performance polymer having good mechanical properties and stability. Furthermore, the polymer facilitates recovery and has good reproducibility and recycling properties.

20 Claims, 5 Drawing Sheets

MACROMOLECULAR POLYMER AND PRODUCTION METHOD THEREOF

CROSS-REFERENCE TO RELATED APPLICATION

The present application claims priority from China Patent Application No. 201710417098.4, filed on Jun. 6, 2017, in the State Intellectual Property Office of P. R. China, the disclosure of which is incorporated herein in its entirety by reference.

TECHNICAL FIELD

One or more embodiments described herein relate to the field of polymer materials, and in particular, it relates to a macro-molecular polymer having such as a thermal stability and the like and its preparation method.

BACKGROUND

High performance polymers have good thermal and mechanical properties, which are widely used in aerospace, microelectronics, precision machinery, medical equipment and other fields, and show great application prospects and huge commercial value. In recent years, with the development of national economy, conventional high-performance polymeric materials are no longer satisfied broader applications, thereby requiring polymer materials to have more superior thermal stability, mechanical strength and anti-cracking properties and the like.

Overall performance of high-performance polymers can be further improved by means of crosslinking of molecular chains of polymers to obtain a class of ultra-high performance polymer, even if the polymer performance such as thermal stability and mechanical strength can further enhance by a way of chemical crosslinking, the crosslinked polymer is difficult to recycle after use, it cannot be recast. Its waste materials usually only treated by waste landfill. As people growing demand for high-performance polymers as well as ultra-high performance, recovery and recycling of high-performance polymer materials will be a common problem.

SUMMARY

Accordingly, the embodiment is directed to solving at least one of the aforesaid problems of the prior art. For example, one of the aspects of the exemplary embodiment is to provide a novel polymer. To achieve the above aspect, the embodiment provides a macro-molecular polymer. The macro-molecular polymer takes disulfonate-difluorobenzophenone, hydroxyindole and difluorobenzophenone as monomers, and the sulfonate group of the disulfonate-difluorobenzophenone presents metal cations.

Another aspect of the embodiment is to provide a method capable of preparing the macro-molecular polymer. To achieve the above aspect, the embodiment provides the method may include the steps of: making metal cations and an aqueous solution of disulfonate-difluorobenzophenone reacting to precipitate a sulfonated component; mix the sulfonated component, hydroxyindole, and difluorobenzophenone in an organic solvent in inert gas, with continuous stirring and heating for reacting, to obtain sulfonated poly (aryl indole ketone)s.

The method may further include preparing the sulfonated poly (aryl indole ketone)s dissolved in an organic solvent and then casting to form the polymer profile. Here, the polymer profile can be of various sizes and shapes, for example, may be a film. In yet another aspect of the exemplary embodiment, the metal cations are alkali metal cations. The heating temperature can be controlled in a range of 150° C. to 200° C.

In still another aspect of the exemplary embodiment, the molar ratio of the sulfonated component to the difluorobenzophenone is 1:(1 to 10), and the molar ratio of the hydroxyindole to the difluorobenzophenone is (1.1 to 2.0):1.

A further aspect of the exemplary embodiment is to provide a macro-molecular polymer having a good thermal stability and be easy to recovery and reuse. To achieve the above aspect, a macro-molecular polymer with the following structural formula is provided:

Specifically, ⊕ may be a metal cation, m may be in a range of 1 to 100, and n may be in a range of 200 to 400.

DETAILED DESCRIPTION

Hereinafter, it will be explained in detail macro-molecular polymers and its preparation method according to an aspect of the exemplary embodiment.

In the one aspect, the macro-molecular polymer uses disulfonate-difluorobenzophenone, hydroxyindole and difluorobenzophenone as monomers, and a sulfonate group of the disulfonate-difluorobenzophenone to present a metal cation. There, the metal cation can be an alkali metal ion, including one or more compound selected from the group consisting of $K^+$, $Na^+$, $Li^+$, $Rb^+$ and $Cs^+$.

In the present exemplary embodiment, the macro-molecular polymer may have a crosslinking structure. For example, the crosslinking structure may be achieved through the interaction between the metal cation and $\pi$ of the indole group.

In another aspect of the embodiment, the preparation of a macro-molecular polymer may comprise of the following steps:

S01, Synthesis of Sulfonated Components

For example, make metal cations and an aqueous solution of disulfonate-difluorobenzophenone reacting to precipitate a sulfonated component. In the sulfonated component, metal cations of a metal salt can be capable of binding with sulfonated groups of disulfonate difluorobenzophenone.

Specifically, the metal cation may be provided by a metal hydroxide, metal salts and etc. Metal salts may be the alkali metal salts having no oxidizing, e.g., alkali metal chlorides, alkali metal carbonates and alkali metal nitrate compounds and the like. However, the present embodiment is not limited thereto. Further, an aqueous solution of disulfonate-difluorobenzophenone can be obtained by sulfonation reaction of difluorobenzophenone. However, the present embodiment is not limited thereto.

Taking sodium ions as cations, the synthesis process of sulfonated components may be shown as formula (1). Of course, as potassium ions could also be the cations, the Na of reaction process in formula (1) is only changed to K.

(1)

S02, Synthesis of Sulfonated Poly (Aryl Indole Ketone)s

For example, mix the sulfonated component, hydroxyindole, and difluorobenzophenone in an organic solvent in inert gas (e.g., nitrogen), with continuous stirring and heating for reacting, to obtain sulfonated poly (aryl indole ketone)s.

Specifically, the inert gas may be nitrogen, but the present embodiment is not limited thereto. The organic solvent may be dimethyl sulfoxide, but the present embodiment is not limited thereto, it may also be other organic solvents which may provide a dissolving environment. The heating temperature is appropriate to be able to drive the reaction but not to destroy the structure of each organic component. For example, the heating temperature can be controlled within a range of 150° C. to 200° C., but the present embodiment is not limited thereto.

In step S02, the ratio of sulfonated component, hydroxyindole, and difluorobenzophenone may be adjustable, as long as the sulfonated poly (aryl indole ketone)s can be generated. For example, in order to improve raw material utilization, the molar ratio of the sulfonated component to the difluorobenzophenone may be 1:(1 to 10), and the molar ratio of the hydroxyindole to the difluorobenzophenone may be (1.1 to 2.0):1. However, the present embodiment is not limited thereto. Again, the molar ratio of the sulfonated component to the difluorobenzophenone may be 1:(3 to 7), and the molar ratio of the hydroxyindole to the difluorobenzophenone may be (1.3 to 1.7):1.

Further, after the reaction (e.g., polymerization) in step S02 is completed, it may be further cooled, filtered, washed, and vacuum dried to obtain a more pure sulfonated poly (aryl indole ketone)s.

Further, a catalyst may be added to the organic solvent. For example, the catalyst may be one or more selected from the group consisting of potassium carbonate, cesium carbonate, potassium tert-butoxide and sodium tert-butoxide.

Taking sodium ions as cations, the synthesis process of sulfonated of poly (aryl indole ketone)s may be shown as formula (2). Of course, as potassium ions could also be the cations, the Na of reaction process in formula (2) is only changed to K.

(2)

The macro-molecular polymer prepared according to the above method of the exemplary embodiment are using disulfonate-difluorobenzophenone, hydroxyindole and difluorobenzophenone as monomers, and the sulfonate group of the disulfonate-difluorobenzophenone presents a metal cation. Further, the macro-molecular polymer present in a crosslinking structure which takes the interaction between the metal cation and π of the indole group as a crosslinking site. The macro-molecular polymer has good thermal stability.

In another aspect of the exemplary embodiment, the general structure of the polymer may be shown below as formula (3).

(3)

Specifically, ⊕ may be a metal cation, m may be in a range of 1 to 100, and n may be in a range of 200 to 400.

In the present exemplary embodiment, the metal cation may be an alkali metal ion, for example, may be one or more selected from the group consisting of $K^+$, $Na^+$, $Li^+$, $Rb^+$ and $Cs^+$, and the polymer may have a crosslinking structure. For example, the crosslinking structure may be achieved through the interaction between the metal cation and π of the indole group The exemplary embodiment will be described in further detail below in conjunction with the accompanying drawings and specific examples.

The applicants have devised the polymers of Comparative Example 1 and 2 which have free sulfonated groups, in order to illustrate that the presence of interaction between the metal cation –π occurs in metal cations-indole, and the macro-molecular polymer according to an aspect of the exemplary embodiment have a crosslinking structure.

Comparative Example 1: Synthesis of Poly (Indol-Aryl Ketone)s (Hereinafter Referred to as PAIKs)

A three-necked flask (25 mL) was equipped with a magnetic stirrer, a rubber septum, and a water-cooled condenser. 4.0 mmol 4-hydroxyindole, 4.0 mmol 4,4-difluorobenzophenone (hereinafter referred to as DF), 8 mmol $K_2CO_3$ and 10.0 mL of dimethyl sulfoxide (hereinafter referred as DMSO) were mixed under nitrogen to prepare PAIKs. The reaction mixture was evacuated and flushed three times with purified nitrogen. The reaction mixture was heated to 160° C. with stirring for 2 h, and then the temperature was subsequently brought to 190° C. and maintained at this temperature for 3 h. The resulting polymer solution was slowly cooled to room temperature still with stirring, and subsequently poured into ice-cold deionized water. The precipitate was filtered, washed with water and methanol several times, then dried at 100° C. in vacuum for 2 h, and finally obtained a solid PAIKs. The yield of PAIKs was 93%. The chemical reaction is as follows:

Comparative Example 2 Synthesis of a Model Compound

Figure 1:
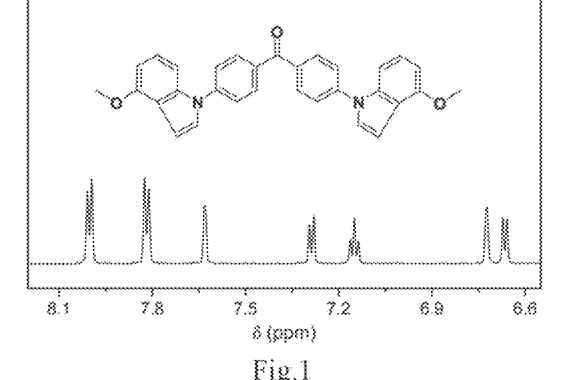
FIG. 1 shows a nuclear magnetic resonance (NMR) spectrum of model compounds of Comparative Example 2.

A Schlenk flask was charged with 2.2 mmol 4-methoxyindole, 1.0 mmol DF, 2 mmol $K_2CO_3$, and 5 mL DMSO. The reaction mixture was evacuated and flushed with nitrogen three times. The flask was immersed in a 160° C. oil bath with continuous stirring for 4 h. The resulting solution was slowly cooled to room temperature, poured into ice-cold deionized water, then filtered through Celite, dried, and finally obtained the model compound. Its yield was 98%. FIG. 1 shows a 1H nuclear magnetic resonance (1H NMR) spectrum of model compounds of Comparative Example 2. As shown in FIG. 1, the chemical structure of the model compounds may be confirmed by using 1H NMR. The chemical reaction is as follows:

Example 1

Figure 2:
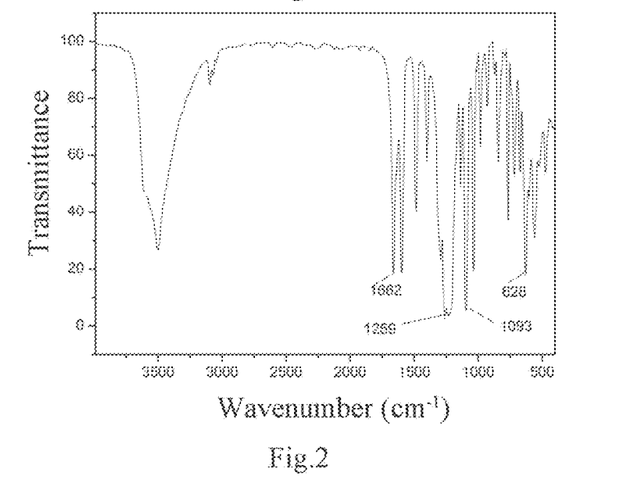
FIG. 2 shows an infrared spectrum of disodium disulfonate-difluorobenzophenone.
Figure 3:
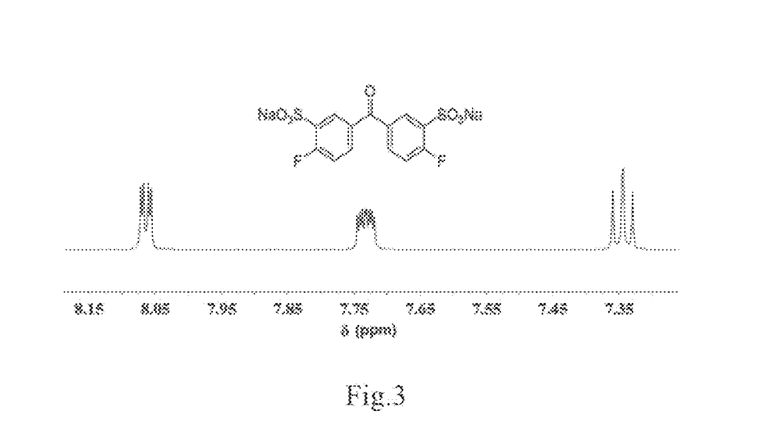
FIG. 3 shows a nuclear magnetic resonance spectrum of disodium disulfonate-difluorobenzophenone.

(1) Synthesis of disodium 3,3'-disulfonate-4,4'-difluorobenzophenone (hereinafter referred to as SDF). 0.2 mol of DF was dissolved in 80 ml of 20% fuming sulfuric acid. The solution was stirred at a rate of 500 rpm at 110° C. for 6 h. Then the solution was slowly cooled to room temperature and poured into ice-cold deionized water. Sodium hydroxide (NaOH) was added to neutralize the solution. In the next step, excess sodium chloride was added at room temperature to precipitate the sulfonated ingradient. The sulfonated ingradient was further filtered, re-crystallized for three times using a mixture of methanol and water. The yield of the sulfonation reaction is approximately 82%. FIGS. 2 and 3 show an infrared spectrum (FTIR) and 1H nuclear magnetic resonance spectrum of disodium disulfonate-difluorobenzophenone (SDF), respectively. The chemical structure of the SDF may be confirmed by infrared spectroscopy (FTIR) and 1H NMR spectroscopy (1H NMR) as shown in FIGS. 2 and 3.

(2) Synthesis of sulfonated poly (aryl indole ketone)s (hereinafter referred to as SPAIKs) 4.0 mmol 4-hydroxyindole, 3.2 mmol DF, 0.8 mmol SDF, 8 mmol $K_2CO_3$, and 8.0 mL DMSO were mixed under nitrogen. The reaction mixture was heated to 140° C. with stirring for 3 h, and then the temperature was subsequently brought to 180° C. and maintained at this temperature for 12 h. The resulting polymer solution was allowed to slowly cool to room temperature still with stirring, and subsequently poured into ice-cold deionized water. The precipitate was filtered, washed with water and methanol several times, and then dried in vacuum. Finally, SDF/(SDF+DF)=20% of SPAIKs polymer was obtained, and its yield was 98%.

Figure 4:
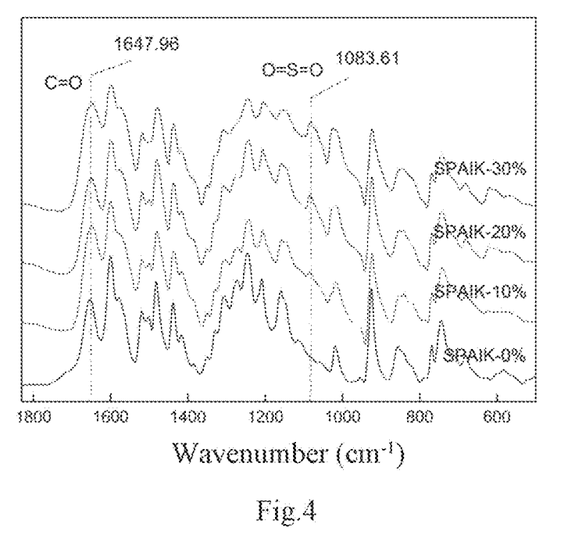
FIG. 4 illustrates the infrared spectrums of poly (aryl indole ketone)s and sulfonated poly (aryl indole ketone)s with various amounts of sulfonate group.
Figure 5:
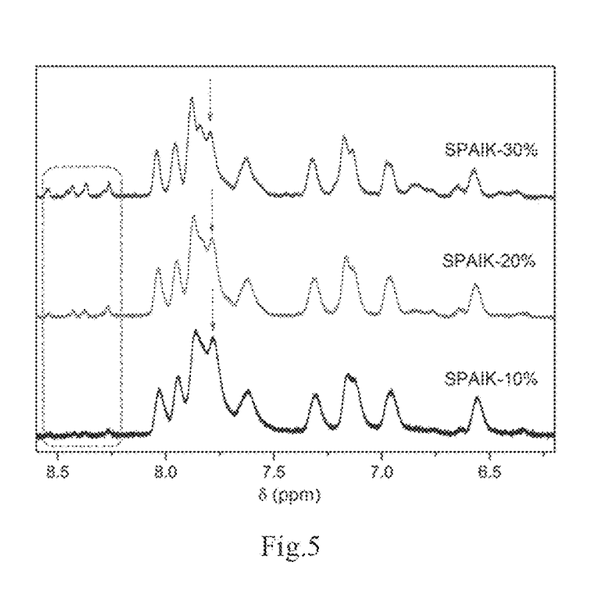
FIG. 5 shows a nuclear magnetic resonance spectrum of sulfonated poly (aryl indole ketone)s with various amounts of sulfonate group.

Synthesis of other SPAIKs with different SDF/(SDF+DF) were carried out in the same manner with polymerization yields all being high (e.g., 95% or more). FIG. 4 illustrates the FTIRs of poly (aryl indole ketone)s (PAIKs) and sulfonated poly (aryl indole ketone)s (SPAIKs) with various amounts of sulfonate group. FIG. 5 shows 1H nuclear magnetic resonance spectrum of sulfonated poly (aryl indole ketone)s (SPAIKs) with various amounts of sulfonate group. The infrared spectrums and 1H nuclear magnetic resonance spectrums of SPAIKs with different mole fractions SDF/(SDF+DF) may be shown as in FIGS. 4 and 5, wherein, SPAIKs-10%, SPAIKs-20%, and SPAIKs-30% represent the mole fraction ratio SDF/(SDF+DF) in SPAIKs is 10%, 20% and 30%, respectively; SPAIKs-0% represent PAIKs with the mole fraction SDF/(SDF+DF) of 0/o. Their molecular weight and PDI (i.e., $M_w/M_n$) are listed in Table 1.

TABLE 1

| Polymerization parameters of SPAIKs and PAIKs | | | | |
|---|---|---|---|---|
| items | $M_n$ (kg/mol) | $M_n$ (kg/mol) | $M_w/M_n$ | eld (%) |
| PAIKs | 125.6 | 296.5 | 2.4 | 93 |
| % sulfonate group-containing SPAIKs | 110.8 | 293.4 | 2.7 | 95 |
| % sulfonate group-containing SPAIKs | 108.0 | 251.8 | 2.3 | 98 |
| % sulfonate group-containing SPAIKs | 97.6 | 223.4 | 2.3 | 97 |

To illustrate the metal cation-π interaction present in the polymer SPAIKs, the applicants have designed a model compound constructed by a variant of indole and DF, as shown in the chemical reaction formula of Comparative Example 2.

Figure 6:
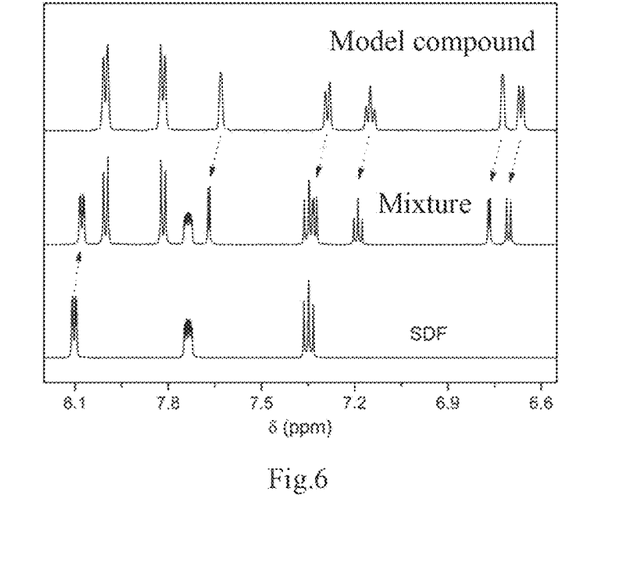
FIG. 6 shows nuclear magnetic resonance spectrums of the model compound, the disodium disulfonate-difluorobenzophenone, and a mixture containing equal molar amounts of disodium disulfonate-difluorobenzophenone and indole in DMSO-d6.

The applicant performed 1H NMR measurements to study the model compound, SDF, and a mixture containing equal molar amounts of SDF and indole in DMSO-d6, as shown in FIG. 6. It may be found that most proton peaks corresponding to the indole in a NMR result of the SDF/indole mixture shifted downfield while chemical shifts of a sulfonate proton moved to higher field as compared to the NMR result of the model compound (indicated by arrows in FIG. 6). The movement of these proton peaks reflected that the cation-π interaction pushes electrons on indole groups toward metal cations on sulfonates. Therefore, there is also metal cation –π interactions in polymer SPAIKs, and the site of action is a metal cation-indole.

Further, in one aspect of the exemplary embodiment, the macro-molecular polymer (e.g., SPAIKs) may be cast in materials with various shapes and sizes. For example, in order to verify the mechanical properties of the material, the polymer powders may be dissolved in DMSO, and then cast on a slide glass through a membrane filter to obtain a SPAIKs film. At room temperature, the resulting film is translucent, non-tacky solid. However, the present embodiment is not limited thereto.

The solvent resistance is one of the key properties of thermosets. Thus, the solubility of PAIKs and SPAIKs film were examined. As shown in Table 2, the solubility was qualitatively determined by immersing an approximately 5 mg solid material in 1 mL of organic solvents (e.g., dimethylacetamide (DMAc$^a$), DMSO, dimethyl formamide (DMF$^b$), N-methyl-2-pyrrolidinone (NMP$^c$), tetrahydrofuran (THF$^d$), chloroform) at room temperature and 50° C., respectively. It can be noted that PAIKs with 0% of sulfonate group can be soluble in many solvents. This indicates that the bulk PAIKs is in a linear form without the formation of crosslinking. In contrast, SPAIKs with varying sulfonate groups are insoluble in all solvents tested. It indicates that the SPAIKs polymeric material (e.g., film SPAIKs) forms a crosslinking structure.

TABLE 1

Solubility of PAIKs and SPAIKs at different temperatures and different solvents

| Sample | DMAc$^a$ | DMSO | DMF$^b$ | NMP$^c$ | THF$^d$ | chloroform |
|---|---|---|---|---|---|---|
| PAIKs | − +$^e$ | − + | + | + | − | − − |
| AIKs- 10% | − − | − − | − | − | − | − − |
| AIKs- 20% | − − | − − | − | − | − | − − |
| AIKs- 30% | − − | − − | − | − | − | − − |

Together, these measurements show that there are cation-π interactions (complexes) between indole and metal cations (K+) as crosslinking sites in SPAIKs. In addition, different amounts of sulfonate groups (SDF/(SDF+DF) =10%-300/%) will occur some impact of mechanical properties of SPAIKs material (e.g., film). SPAIKs films with different contents of sulfonate groups are prepared by using SPAIKs with different amounts of sulfonate groups.

Example 2

Preparation of SPAIKs films (molar ratio SDF/(SDF+DF)= 10% or 30/): The as-synthesized polymers with SDF/(SDF+DF)=10% or 30% were precipitated in deionized water several times to remove impurity. The participated polymer powders were dissolved in DMSO (10%, w/v). The solution was filtered through a Teflon syringe membrane filter (0.45 μm pore size, Fisher Scientific) and then, casted onto a glass slide. The membranes were placed in vacuum at 100° C. for 12 h to obtain 10% or 30% SPAIKs films, respectively.

Figure 7:
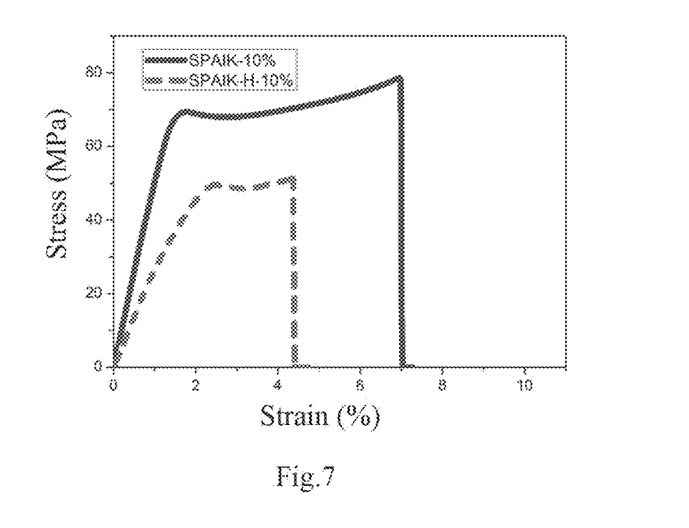
FIGS. 7 and 8 illustrate stress-strain curves of the sulfonated poly (aryl indole ketone)s with various amounts of sulfonate group.
Figure 8:
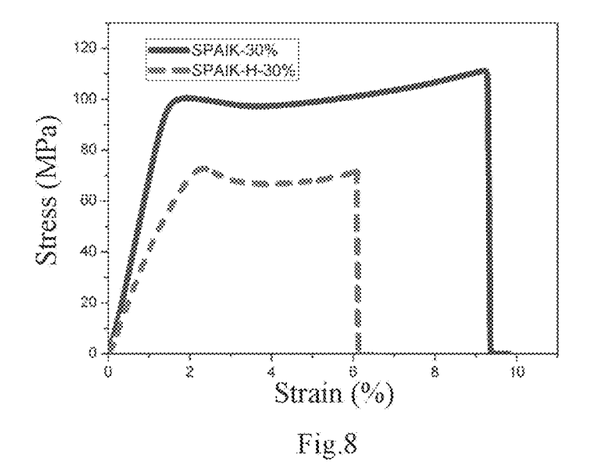

FIG. 7 shows one stress-strain curve (solid line) of the SPAIKs film with SDF/(SDF+DF)=10% and other stress-strain curve (dashed line) of an acidified SPAIKs film with SDF/(SDF+DF)=10% after acid treatment (e.g., immersed for 4 h in dilute sulfuric acid at pH=2). FIG. 7 shows one stress-strain curve (solid line) of the SPAIKs film with SDF/(SDF+DF)=30% and other stress-strain curve (dashed line) of an acidified SPAIKs film with SDF/(SDF+DF)=30% after acid treatment (e.g., immersed for 4 h in dilute sulfuric acid at pH=2).

As shown in FIGS. 7 and 8, the strong complexation, as a crosslinking site, between metal cation-indole can promote stability of the polymer SPAIKs, improving its mechanical properties. Further, the mechanical properties of SPAIKs films will result in large differences because of the varying amount of sulfonate thereof. The breaking stress of the SPAIKs film with SDF/(SDF+DF)=10% is about 80 MPa, and its elongation at break is about 7%. The breaking stress of the SPAIKs film with SDF/(SDF+DF)=30% is about 110 MPa, and its elongation at break is about 9.4%. In addition, the breaking stress of the SPAIKs film with SDF/(SDF+DF)= 20% is about 120 MPa, and its elongation at break is about 10% via determination.

Figure 9:
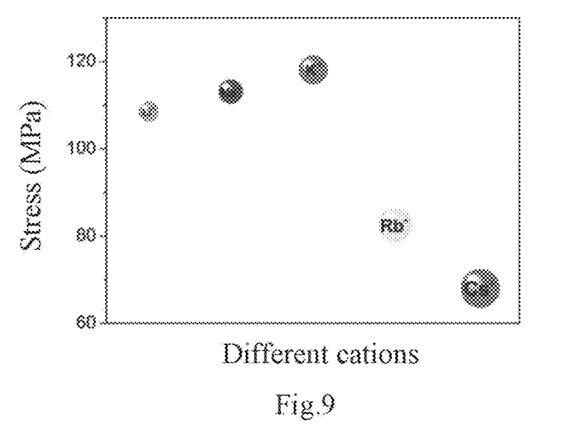
FIG. 9 shows breaking stress curves of a acidified sulfonated poly (aryl indole ketone)s after soaking in solution of different alkali metal cations.

The acidified SPAIKs film with SDF/(SDF+DF)=20% treated with acid (e.g., immersed for 4 h in dilute sulfuric acid at pH=2) was immersed for 4 h in solutions with different alkali metal cations at pH=12 to obtain the alkalized SPAIKs. FIG. 9 illustrates various breaking stress of the alkalized SPAIKs film.

As shown in FIG. 9, the SPAIKs films with the metal cation $K^+$, $Na^+$ or $Li^+$ have better mechanical properties respect to those with the metal cation $Rb^+$ or $Cs^+$. This can be interpreted as the diffusion of a large alkali metal cation (e.g., $Rb^+$ and $Cs^+$) is, to a large extent, hindered in the polymer bulk when soaking, resulting in a reduction in the number of cation-π complexes that act as crosslinking sites, and leading to a significant reduction in the value of breaking stress. Accordingly, in order to obtain better mechanical properties, metal cations of the polymer according to the present embodiment may be preferably an alkali metal ion, more preferably $K^+$, $Na^+$ and/or $Li^+$.

Further, when the polymer SPAIKs based on metal cations −π interaction are soaking in the acid solution, the metal cation in the polymer is substituted with a proton, i.e. the cations −π interaction in the polymer disappears, eliminating a crosslinked structure, thereby causing the mechanical properties of the polymer material reduced. This can effectively solve the problem of recycling of the polymer according to the present embodiment to reduce the environmental burden. Further, the mechanical properties of the polymer according to the present embodiment can be fully recovered by making the acidified macro-molecular polymer via an alkali solution immersion treatment. Therefore, not only the polymer according to the present embodiment facilitates recovery, but also has good reproducibility and recycling properties.

In summary, the technical effect of the present embodiment may comprise: (1) can obtain high-performance polymers with crosslinked structure among molecular chains by a way of interaction of metal cations −π, and further to obtain a high performance polymer having good mechanical properties and stability; (2) not only the polymer according to the present embodiment facilitates recovery, but also has good reproducibility and recycling properties.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims. The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction

What is claimed is:

1. A macro-molecular polymer comprising disulfonate-difluorobenzophenone, hydroxyindole and difluorobenzophenone as monomers, wherein sulfonate groups of the disulfonate-difluorobenzophenone introduces metal cations.

2. The macro-molecular polymer according to claim 1, wherein the metal cations are alkali metal ions.

3. The macro-molecular polymer according to claim 2, wherein the alkali metal ions are selected from $K^+$, $Na^+$ and $Li^+$.

4. The macro-molecular polymer according to claim 1, wherein the macro-molecular polymer has a crosslinking structure.

5. The macro-molecular polymer according to claim 4, wherein the crosslinking structure is achieved through the interaction between the metal cation and π of the indole group.

6. A macro-molecular polymer having a general structure as follows:

wherein ⊕ is a metal cation, m is in a range of 1 to 100, and n is in a range of 200 to 400.

7. The macro-molecular polymer according to claim 6, wherein the metal cation is an alkali metal ion.

8. The macro-molecular polymer according to claim 7, wherein the alkali metal ion is selected from $K^+$, $Na^+$ and $Li^+$.

9. The macro-molecular polymer according to claim 6, wherein the macro-molecular polymer has a crosslinking structure.

10. The macro-molecular polymer according to claim 9, wherein the crosslinking structure is achieved through the interaction between the metal cation and π of the indole group.

11. A method for preparing a macro-molecular polymer comprising the steps of:
making metal cations and an aqueous solution of disulfonate-difluorobenzophenone reacting to precipitate a sulfonated component; and
mixing the sulfonated component, hydroxyindole, and difluorobenzophenone in an organic solvent in inert gas, with continuous stirring and heating for reacting, to obtain sulfonated poly (aryl indole ketone)s.

12. The method for preparing a macro-molecular according to claim 11, wherein the metal cations are alkali metal cations.

13. The method for preparing a macro-molecular according to claim 11, wherein the temperature of the heating is controlled in a range of 150° C. to 200° C.

14. The method for preparing a macro-molecular according to claim 11, wherein the molar ratio of the sulfonated component to the difluorobenzophenone is 1:(1 to 10), and the molar ratio of the hydroxyindole to the difluorobenzophenone is (1.1 to 2.0):1.

15. The method for preparing a macro-molecular according to claim 11, wherein the molar ratio of the sulfonated component to the difluorobenzophenone is 1:(3 to 7), and the molar ratio of the hydroxyindole to the difluorobenzophenone is (1.3 to 1.7):1.

16. The method for preparing a macro-molecular according to claim 11 further comprising the steps of: cooling, filtering, washing, and then drying the sulfonated poly (aryl indole ketone)s in vacuum to obtain a more pure sulfonated poly (aryl indole ketone)s.

17. The method for preparing a macro-molecular according to claim 11, wherein the organic solvent includes a catalyst.

18. The method for preparing a macro-molecular according to claim 17, wherein the catalyst is one or more selected from the group consisting of potassium carbonate, cesium carbonate, potassium tert-butoxide and sodium tert-butoxide.

19. The method for preparing a macro-molecular according to claim 11, wherein the metal cations are provided by metal hydroxides or alkali metal salts having no oxidizing.

20. The method for preparing a macro-molecular according to claim 11, wherein the aqueous solution of disulfonate-difluorobenzophenone is obtained by sulfonation reaction of difluorobenzophenone.

* * * * *